A. P. SWAIDMARK.

HOSE CLAMP.

APPLICATION FILED MAY 15, 1918.

Reissued Aug. 13, 1918. 14,503.

INVENTOR

A. P. Swaidmark

BY

J. T. Edmunds

ATTORNEY

MORRIS PETERS, INC., LITHO., WASHINGTON, D. C.

UNITED STATES PATENT OFFICE.

ALBIN P. SWAIDMARK, OF HACKENSACK, NEW JERSEY, ASSIGNOR TO UNIVERSAL INDUSTRIAL CORPORATION, OF HACKENSACK, NEW JERSEY, A CORPORATION OF DELAWARE.

HOSE-CLAMP.

14,503. Specification of Reissued Letters Patent. Reissued Aug. 13, 1918.

Original No. 1,219,882, dated March 20, 1917, Serial No. 98,587, filed May 19, 1916. Application for reissue filed May 15, 1918. Serial No. 234,799.

*To all whom it may concern:*

Be it known that I, ALBIN P. SWAIDMARK, a citizen of the United States, residing at Hackensack, in the county of Bergen and State of New Jersey, have invented certain new and useful Improvements in Hose-Clamps, of which the following is a specification.

My invention relates to clamps adapted to be used on hose, pipe connections and the like, and the main object thereof is to provide such clamps of universal adaptability in that they may be fitted to hose and the like of any diameter, thereby permitting a supply house to meet all demands with a much smaller stock than is possible with the clamps now in use. My clamp embodies a metal ribbon adapted to be wrapped around a hose or the like with a perpendicular loop formed adjacent one end of the ribbon, through an opening in which the bolt is adapted to pass. The ribbon is provided with a series of holes spaced lengthwise of the ribbon from the other end thereof, the ribbon being adapted to be wrapped around the hose, or other object to be clamped, so that the portion of the ribbon containing the holes referred to will overlap the other end of the ribbon adjacent to the loop, the ribbon then being bent away from the hose parallel with the loop and the bolt passed through the hole, which is in line therewith, and its nut tightened in place. The unused portion of the ribbon extending above the nut and bolt a variable distance, in accordance with the diameter of the hose, which is clamped, may then be bent and broken off above the nut, and to facilitate this operation it is preferable to provide the ribbon with scorings or other weakening means between the various holes through which the bolt is adapted to extend.

Figure 1:
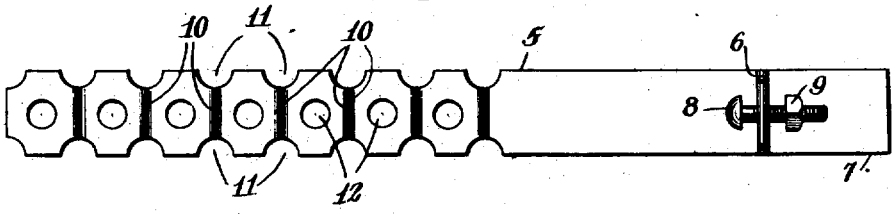
Figure 2:
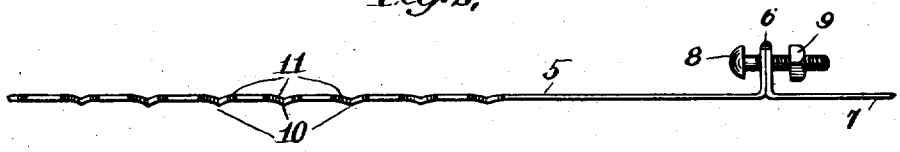
Figure 3:
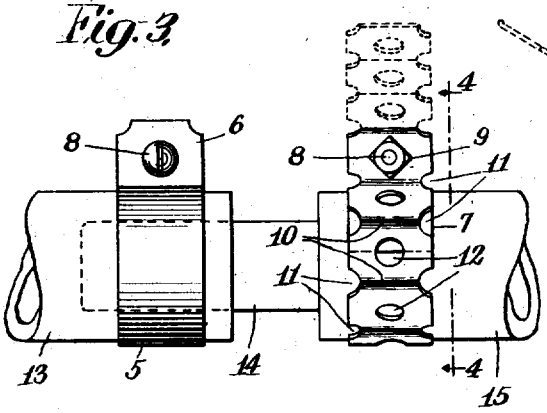

In order that a clearer understanding of my invention may be had, attention is hereby directed to the accompanying drawings forming part of this application and illustrating one embodiment of my invention. In the drawings Figure 1 is an extended view of one form of my clamp, Fig. 2 is an edge view thereof, Fig. 3 is a view of two of my clamps, viewed from opposite sides, joining two hose lengths by means of a pipe section, and Fig. 4 is a section taken on line 4—4 of Fig. 3.

Referring to the drawings, 5 represents a metal ribbon, as of steel, brass or any suitable equivalent, bent into a perpendicular loop 6, adjacent one end 7 and which loop is drilled to form a bearing for a bolt 8 provided with a nut 9, the latter being in the direction of the end 7 of the ribbon.

The ribbon is provided with a series of circular openings 12 extending for a considerable length of the ribbon from the end thereof opposite from the end 7, these openings being spaced at equal distances from each other and midway between the ribbon edges. Preferably also the ribbon is weakened between each of the openings 12, so that any excess length of the ribbon may easily be broken off from the main portion, as will later be explained. This weakening, if used, is preferably provided by the scorings 10 extending across the ribbon on equi-distant lines midway between openings 12. To further weaken the ribbon, recesses or cut-outs 11 may be provided, if desired, at the ends of the scorings 10.

Figure 4:
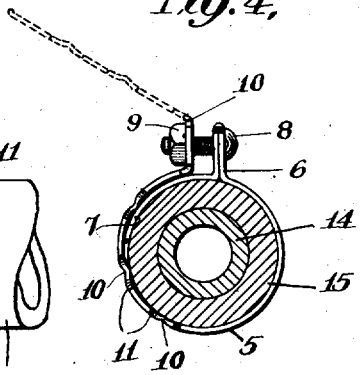

In practice, the end 7 of the ribbon is curved around the hose, or other object to be clamped, and the free end of said ribbon is then wrapped around the hose to overlie the end 7, as is clearly shown in Fig. 4, after which the ribbon is bent outwardly parallel to the loop 6 on the line of scorings nearest to said loop when the ribbon has been so wrapped around the hose, or at a suitable line in the length of the ribbon.

The bolt 8 is now passed through the hole 12 which is in line with the bore in the loop 6, and the nut 9 screwed on said bolt, and, when said nut is tightened, the hose is firmly clamped to a pipe section or other element therein, after which the excess ribbon is bent and broken off above the nut 9, as is indicated in Figs. 3 and 4. The ribbon may conveniently be broken along the line of scoring next beyond the hole 12 through which the bolt passes.

In Fig. 3 I have shown a hose section 13 clamped to a pipe section 14, upon the other end of which is clamped a hose section 15, this being merely to illustrate one manner of using my clamp, and it will be seen that the clamp is very easily and quickly attached and that it is applicable to varying diameters of hose. It may also be noted that my clamps may be used in series when it is desired to obtain a greater length of ribbon than is obtainable from a single unit. This may be accomplished by inserting the bolt 8 of one ribbon through the end opening 12 of a second ribbon and tightening the nut 9, so that the second ribbon will extend beyond the end 7 of the first ribbon as a continuation thereof, the end portion of the second ribbon containing the opening through which the bolt extends bearing against the loop 6 of the first ribbon, and the remainder of the second ribbon extending as a continuation of the first ribbon.

While I have described my invention as a hose clamp, I do not limit myself to such use, nor do I desire to limit myself to the exact structure shown, my invention consisting primarily of a clamp adaptable to hose and other cylindrical elements of greatly varying diameters, and in the preferred embodiment thereof to a metal ribbon weakened at spaced points to facilitate the ready removal of excess ribbon after the clamp has been installed.

What I claim is:—

1. A hose clamp, comprising a ribbon adapted to be wrapped around a hose, said ribbon having a perpendicular loop formed adjacent one end thereof, and a bolt seated in said loop, said ribbon being provided with spaced holes each of which is adapted to receive said bolt to adjust said ribbon to hose of varying diameters, and being weakened between said spaced holes to permit the removal of excess ribbon.

2. As an article of manufacture, a ribbon having a perpendicular loop formed adjacent one end, and a bolt seated in said loop, said ribbon being provided with spaced holes at its other end, with scorings between said holes, and with edge recesses at the ends of each line of scoring.

3. A hose clamp, comprising a metal ribbon adapted to be wrapped around a hose, having a perpendicular loop formed adjacent one end thereof, with the portion between the loop and the end extending forwardly about the hose, and a bolt extending through an opening in said loop, said ribbon being provided with holes spaced lengthwise thereof from the other end thereof, each of which is adapted to receive said bolt to adjust said ribbon to hose of varying diameters, the ribbon being arranged to have its last-named end portion overlap the first-named end, extend upwardly past the bolt, and to then be bent forwardly above said bolt, to facilitate removal of excess ribbon.

This application signed and witnessed this 8th day of May, 1918.

ALBIN P. SWAIDMARK.

Witnesses:

DYER SMITH,

I. McINTOSH.